US011836829B2

(12) United States Patent
Yamada (10) Patent No.: US 11,836,829 B2
(45) Date of Patent: Dec. 5, 2023

(54) DISPLAY CONTROL METHOD, NON-TRANSITORY COMPUTER-READABLE STORAGE MEDIUM, AND DISPLAY DEVICE

(71) Applicant: Seiko Epson Corporation, Tokyo (JP)

(72) Inventor: Yusuke Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/660,486

(22) Filed: Apr. 25, 2022

(65) Prior Publication Data

US 2022/0343559 A1 Oct. 27, 2022

(30) Foreign Application Priority Data

Apr. 27, 2021 (JP) ................... 2021-075254

(51) Int. Cl.
*G06T 11/00* (2006.01)
*G06F 3/14* (2006.01)
(52) U.S. Cl.
CPC ................ *G06T 11/00* (2013.01); *G06F 3/14* (2013.01)
(58) Field of Classification Search
CPC .................................... G06F 3/14; G06T 11/00
See application file for complete search history.

(56) References Cited

U.S. PATENT DOCUMENTS

| 2011/0295879 | A1* | 12/2011 | Logis | ................. | G06F 16/9574 |
| | | | | | 715/764 |
| 2013/0205243 | A1* | 8/2013 | Rivera | ................ | G06F 3/04817 |
| | | | | | 715/776 |
| 2020/0250373 | A1* | 8/2020 | Yamamichi | ........... | G06F 40/169 |

FOREIGN PATENT DOCUMENTS

JP 2020-123234 8/2020

* cited by examiner

*Primary Examiner* — Kenneth B Lee, Jr.
(74) *Attorney, Agent, or Firm* — WORKMAN NYDEGGER (57) ABSTRACT

In a display control method for displaying a first image and a second image each indicating a page constituting a document side by side on a virtual axis of a display face, the method includes adding, to the first image, an object extending outside an image face of the first image when a first operation is received from a user on the first image; and moving the second image in a predetermined direction when a second operation is received from the use on the second image.

7 Claims, 10 Drawing Sheets

DISPLAY CONTROL METHOD, NON-TRANSITORY COMPUTER-READABLE STORAGE MEDIUM, AND DISPLAY DEVICE

The present application is based on, and claims priority from JP Application Serial Number 2021-075254, filed Apr. 27, 2021, the disclosure of which is hereby incorporated by reference herein in its entirety.

BACKGROUND

1. Technical Field

The present disclosure relates to a display control method, a non-transitory computer-readable storage medium, and a display device.

2. Related Art

A device that performs processing according to an operation received from a user is known. JP-A-2020-123234 discloses an information processing device that displays images of a plurality of pages constituting a document and attaches an electronic sticky note to the image of the page when an insertion operation is received from the user on the image of the plurality of pages.

In JP-A-2020-123234, an electronic sticky note on which characters are input is attached to a page image in order for the user to grasp the outline of a desired page. However, in JP-A-2020-123234, the user is required to input characters in order to grasp the outline, and the user cannot easily grasp the outline of a desired page.

SUMMARY

According to an aspect of the present disclosure, in a display control method for displaying a first image and a second image each corresponding to a page constituting a document side by side on a virtual axis of a display face, the method includes adding, to the first image, an object extending outside an image face of the first image when a first operation is received from a user on the first image, and moving the second image in a predetermined direction when a second operation is received from the use operation on the second image.

According to another aspect of the present disclosure, in a non-transitory computer-readable storage medium storing a program, the program causes a processor of a display device having a display face to display a first image and a second image each corresponding to a page constituting a document side by side on a virtual axis of a display face, add, to the first image, an object extending outside an image face of the first image when a first operation is received from a user on the first image, and move the second image in a predetermined direction when a second operation is received from the use on the second image.

According to still another aspect of the present disclosure, a display device includes an operation unit that receives an operation by a user, a display unit having a display face, and a display controller that causes the display unit to display a first image and a second image each corresponding to a page constituting a document side by side on a virtual axis of the display face, wherein the display controller adds, to the first image, an object extending outside an image face of the first image when the operation unit receives a first operation on the first image from a user, and moves the second image in a predetermined direction when the operation unit receives a second operation on the second image from the use.

DESCRIPTION OF EXEMPLARY EMBODIMENTS

Figure 1:
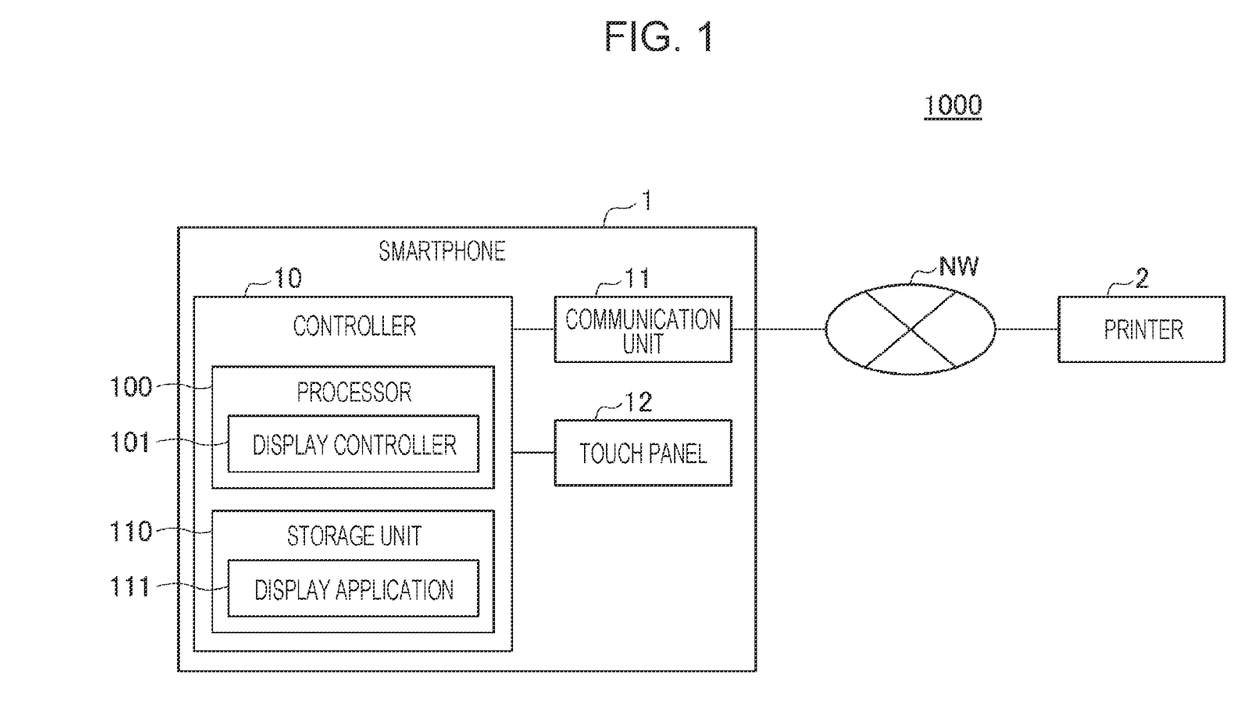
FIG. 1 is a diagram showing a configuration of a printing system.

FIG. 1 is a diagram showing a configuration of a printing system 1000. The printing system 1000 includes a smartphone 1 and a printer 2. The smartphone 1 and the printer 2 are connected to a network NW. The network NW may be a local network, or may be a global network composed of the Internet, a dedicated circuit, a public circuit, or the like. The smartphone 1 corresponds to an example of a display device.

The smartphone 1 may be a notebook personal computer (PC), a desktop PC, or a tablet terminal. A display application 111, which is an application program for displaying an image based on document data, is installed on the smartphone 1. Document data is data indicating a document composed of one or a plurality of pages. Examples of the data format of the document data include a Word format and a portable document format (PDF). The display application 111 has a function of displaying a page image PG which is an image of a page constituting the document indicated by the document data. The display application 111 has a function of displaying a thumbnail image SG of the page based on the document data. The display application 111 has a function of generating print data corresponding to the command system of the printer 2 connected to the smartphone 1 or print data corresponding to the command system of another printer (not shown). The display application 111 has a function of transmitting the generated print data to the printer 2. The display application 111 corresponds to an example of a program.

The printer 2 is a device that prints an image on a print medium. The type of print medium is not limited, and examples thereof include cut paper, roll paper, and synthetic resin sheets of a predetermined size. There are no restrictions on the printing method of the printer 2, and examples of the printing method may include a dot impact type, a thermal sublimation type, and a thermal type. The present embodiment exemplifies a case where the printing method of the printer 2 is an ink jet method.

The configuration of the smartphone 1 will be described. The smartphone 1 includes a controller 10, a communication unit 11, and a touch panel 12. The touch panel 12 corresponds to an example of an operation unit and a display unit.

The controller 10 includes a processor 100, for executing programs, such as a central processing unit (CPU) and a micro-processing unit (MPU), and a storage unit 110, and controls each unit of the smartphone 1. The processor 100 reads out the programs stored in the storage unit 110 and executes various processes by hardware and software. The processor 100 executes the display application 111 stored in the storage unit 110 and functions as a display controller 101.

The storage unit 110 is a memory that stores a program executed by the processor 100 and data processed by the processor 100. The storage unit 110 stores the display application 111 executed by the processor 100, various programs, and other various pieces of data. The storage unit 110 has a non-volatile storage area and a volatile storage area. The volatile storage area may constitute the work area of the processor 100.

The communication unit 11 is a communication interface that perform communication according to a predetermined communication standard, and communicates with the printer 2 via the network NW under the control of the controller 10. The communication unit 11 transmits the print data output by the display application 111 to the printer 2. The print data includes print conditions and print commands. The communication unit 11 receives document data from a server device or client device (not shown) via the network NW.

The touch panel 12 includes a display panel such as a liquid crystal display panel and a touch sensor that is provided so as to overlap with or provided integrally with the display panel. The display panel displays various images under the control of the controller 10. The touch sensor detects a touch operation to output the result to the controller 10. The controller 10 executes a process corresponding to the touch operation based on the input from the touch sensor.

The processor 100 functions as the display controller 101. The display controller 101 communicates with a device connected to the network NW via the communication unit 11. The display controller 101 transmits the print data generated by the controller 10 to the printer 2 via the communication unit 11. The display controller 101 receives document data from a server device or a client device (not shown) via the communication unit 11. The print data generated by the controller 10 includes page print data in which any page is printed among the pages constituting the document indicated by the document data.

The display controller 101 causes the touch panel 12 to display a plurality of user interface screens. When the plurality of user interface screens is not individually distinguished, it is referred to as an application UI202. The display controller 201 provides various pieces of information to the user and receives various instructions from the user by displaying the application UI202 on the touch panel 12.

The application UI202 will be described with reference FIGS. 2 to 8. In FIGS. 2 to 8, a direction upward in the figure is indicated by a reference numeral UP as upward, a direction downward in the figure is indicated by a reference numeral DW as downward, a direction leftward in the figure is indicated by a reference numeral L as left, and a direction rightward in the figure is indicated by a reference numeral R as right.

Figure 2:
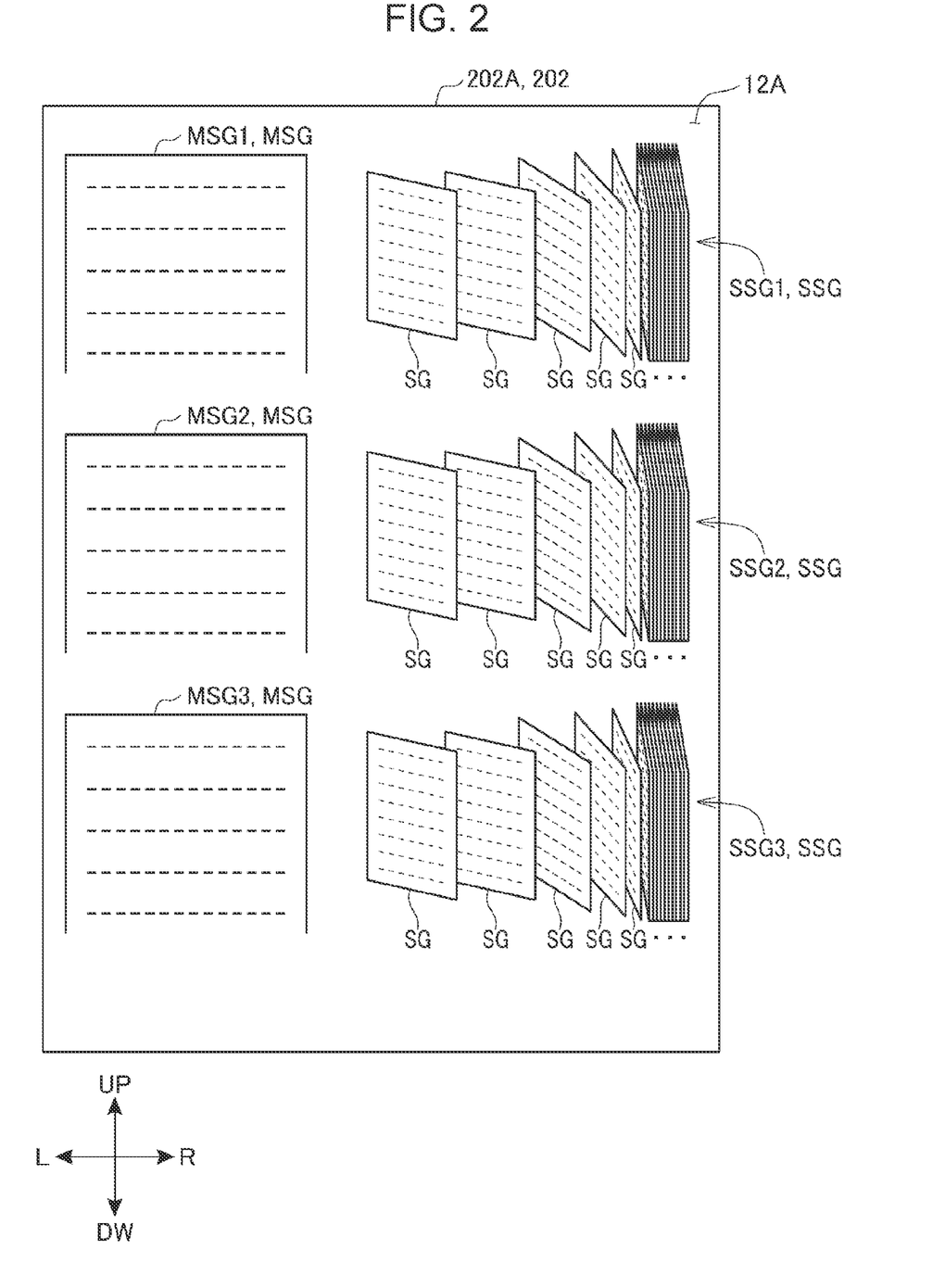
FIG. 2 is a diagram showing an example of a list application UI.

The display controller 101 causes the touch panel 12 to display a list application UI202A for displaying a list of the document data. The list application UI202A is included in the application UI202. FIG. 2 is a diagram showing an example of the list application UI202A.

The list application UI202A displays a combination of a thumbnail image group SSG and a main thumbnail image MSG for each document data. In the following description, the thumbnail image group SSG of the n-th document data is represented as the n-th thumbnail image group SSGn. The main thumbnail image MSG of the n-th document data is represented as the n-th main thumbnail image MSGn. n is an integer of 1 or more.

The list application UI202A shown in FIG. 2 displays a combination of a first thumbnail image group SSG1 and a first main thumbnail image MSG1 based on the first document data at a predetermined position. The list application UI202A displays a combination of a second thumbnail image group SSG2 and a second main thumbnail image MSG2 based on the second document data. The combination of the second thumbnail image group SSG2 and the second main thumbnail image MSG2 is displayed side by side under the combination of the first thumbnail image group SSG1 and the first main thumbnail image MSG1. The list application UI202A displays a combination of the third thumbnail image group SSG3 and the third main thumbnail image MSG3 based on the third document data. The combination of the third thumbnail image group SSG3 and the third main thumbnail image MSG3 is displayed side by side under the combination of the second thumbnail image group SSG2 and the second main thumbnail image MSG2.

The thumbnail image group SSG is an image group in which a plurality of thumbnail images SG is disposed in the left-right direction. Each of the thumbnail images SG included in the thumbnail image group SSG is displayed in a state of being viewed from a predetermined viewpoint in a bird's-eye view. One thumbnail image SG included in the thumbnail image group SSG corresponds to one page of the document indicated by the corresponding document data. The thumbnail image SG of the present embodiment is a rectangular image.

The main thumbnail image MSG is a thumbnail image SG corresponding to a representative page of the document data. An example the representative page may include the top page of the document data. The list application UI202A may display part of the thumbnail image SG of the predetermined page as the main thumbnail image MSG, or may display all of the thumbnail image SG of the predetermined page as the main thumbnail image MSG.

In the list application UI202A, the combination of the thumbnail image group SSG and the main thumbnail image MSG can be selected by a touch operation. When the combination is selected in the list application UI202A, the display controller 101 displays a selection application UI202B related to the selected document. The selection application UI202B is included in the application UI202.

Figure 3:
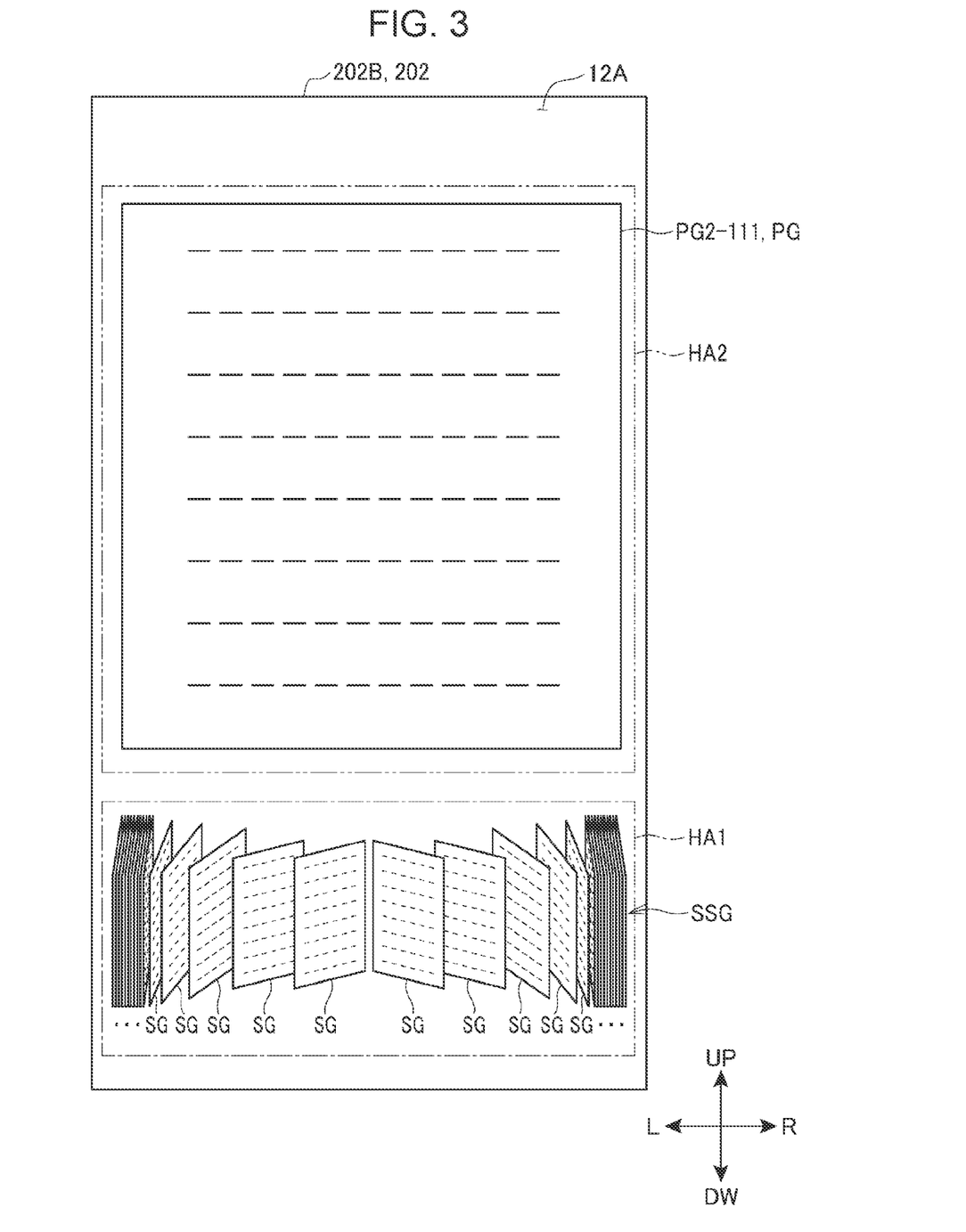
FIG. 3 is a diagram showing an example of a selection application UI.

FIG. 3 is a diagram showing an example of the selection application UI202B.

The selection application UI202B has a thumbnail image group display area HA1 and a page image display area HA2.

The thumbnail image group display area HA1 is an area in which the thumbnail image group SSG selected by the list application UI202A is displayed. When a combination of the first main thumbnail image MSG1 and the first thumbnail image group SSG1 is selected in the list application UI202A, the thumbnail image group display area HA1 displays the first thumbnail image group SSG1 included in the selected combination.

The display controller 101 changes the display mode of the thumbnail image group SSG by performing a predetermined touch operation such as a slide operation by an indicator in the thumbnail image group display area HA1.

When the slide operation to the right is performed, the plurality of thumbnail images SG moves from the left to the right according to the amount of movement of the indicator to the right in the thumbnail image group display area HA1. When the slide operation to the left is performed, the plurality of thumbnail images SG moves from the right to the left according to the amount of movement of the indicator to the left in the thumbnail image group display area HA1.

The page image display area HA2 is an area in which the page image PG of the page corresponding to the thumbnail image SG selected in the thumbnail image group display area HA1 is displayed. In the following description, the page image PG corresponding to the m-th page of the document indicated by the n-th document data is numbered n-m following the reference numeral PG. m is an integer of 1 or more. The page image PG2-111 shown in FIG. 3 indicates the page image PG corresponding to the 111th page of the document indicated by the second document data.

In the page image display area HA2, the page image PG to be displayed is switched by performing a predetermined touch operation such as a slide operation by the indicator.

When a predetermined touch operation to the right is performed in the page image display area HA2, the page image PG of a page before a page corresponding to the page image PG displayed before the touch operation is displayed in the page image display area HA2. When a predetermined touch operation to the left is performed in the page image display area HA2, the page image PG of a page before a page corresponding to the page image PG displayed after the touch operation is displayed in the page image display area HA2.

When the slide operation to the right is performed in the state of FIG. 3, the page image PG2-110 is displayed in the page image display area HA2. When the slide operation to the left is performed in the state of FIG. 3, the page image PG2-112 is displayed in the page image display area HA2.

When the page image PG is switched in the page image display area HA2, the display mode of the thumbnail image group SSG changes in the thumbnail image group display area HA1, and the thumbnail image SG corresponding to the switched page image PG is located in the generally center in the left-right direction.

The thumbnail image group display area HA1 will be described in detail. In the following description, the thumbnail image SG corresponding to the m-th page of the document indicated by the n-th document data is numbered n-m following the reference numeral SG. The thumbnail image SG2-98 indicates the thumbnail image SG corresponding to the 98th page of the document indicated by the second document data.

Figure 4:
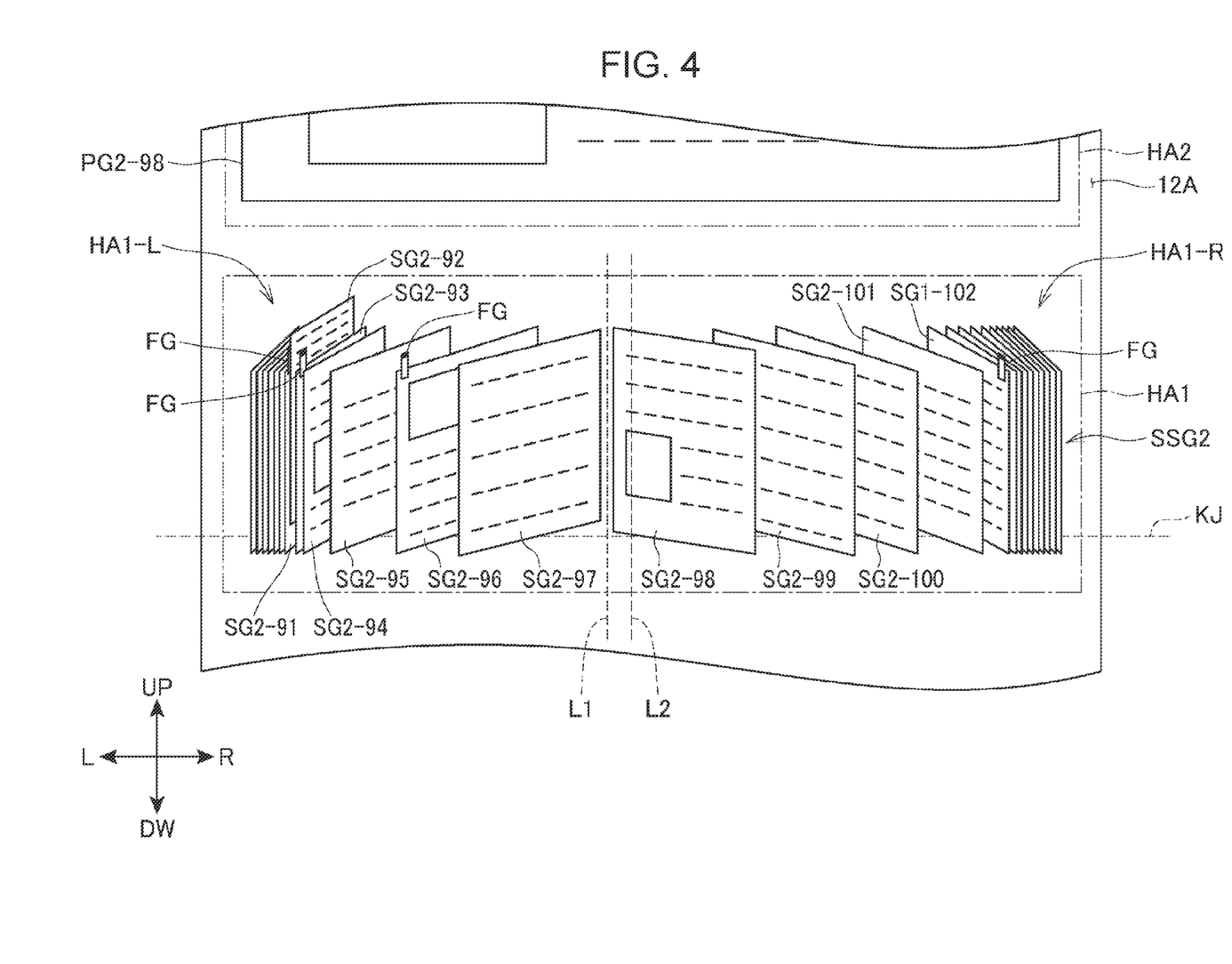
FIG. 4 is a diagram showing an example of a thumbnail image group displayed in a thumbnail image group display area.

FIG. 4 is a diagram showing an example of the thumbnail image group SSG displayed in the thumbnail image group display area HA1.

FIG. 4 illustrates a case where the second thumbnail image group SSG2 is displayed in the thumbnail image group display area HA1. The second thumbnail image group SSG2 is displayed in the thumbnail image group display area HA1 in FIG. 4 in a display mode when the page image PG2-98 is displayed in the page image display area HA2.

In the thumbnail image group display area HA1, each of the thumbnail images SG is displayed side by side on a virtual axis KJ of a display face 12A of the touch panel 12. The virtual axis KJ is an axis parallel to the left-right direction.

The thumbnail image group display area HA1 has a right area HA1-R and a left area HA1-L. The right area HA1-R and the left area HA1-L are disposed in the left-right direction with a switching line L1 therebetween. The switching line L1 is a virtual line located left of a center line L2 and extends in the vertical direction. The center line L2 is a virtual line indicating the center of the thumbnail image group display area HA1 in the left-right direction, and extends in the vertical direction.

In FIG. 4, the thumbnail image SG2-98 is displayed with the thumbnail image SG2-98 overlapping with the center line L2. The thumbnail image SG2-97 corresponding to a page before a page corresponding to the thumbnail image SG2-98 is displayed in the left area HA1-L. The thumbnail image SG2-98 and the thumbnail image SG2-99 corresponding to a page after a page corresponding to the thumbnail image SG2-98 are displayed in the right area HA1-R.

In the thumbnail image group display area HA1, the orientation of the image face of the thumbnail image SG is switched with reference to the switching line L1.

Figure 5:
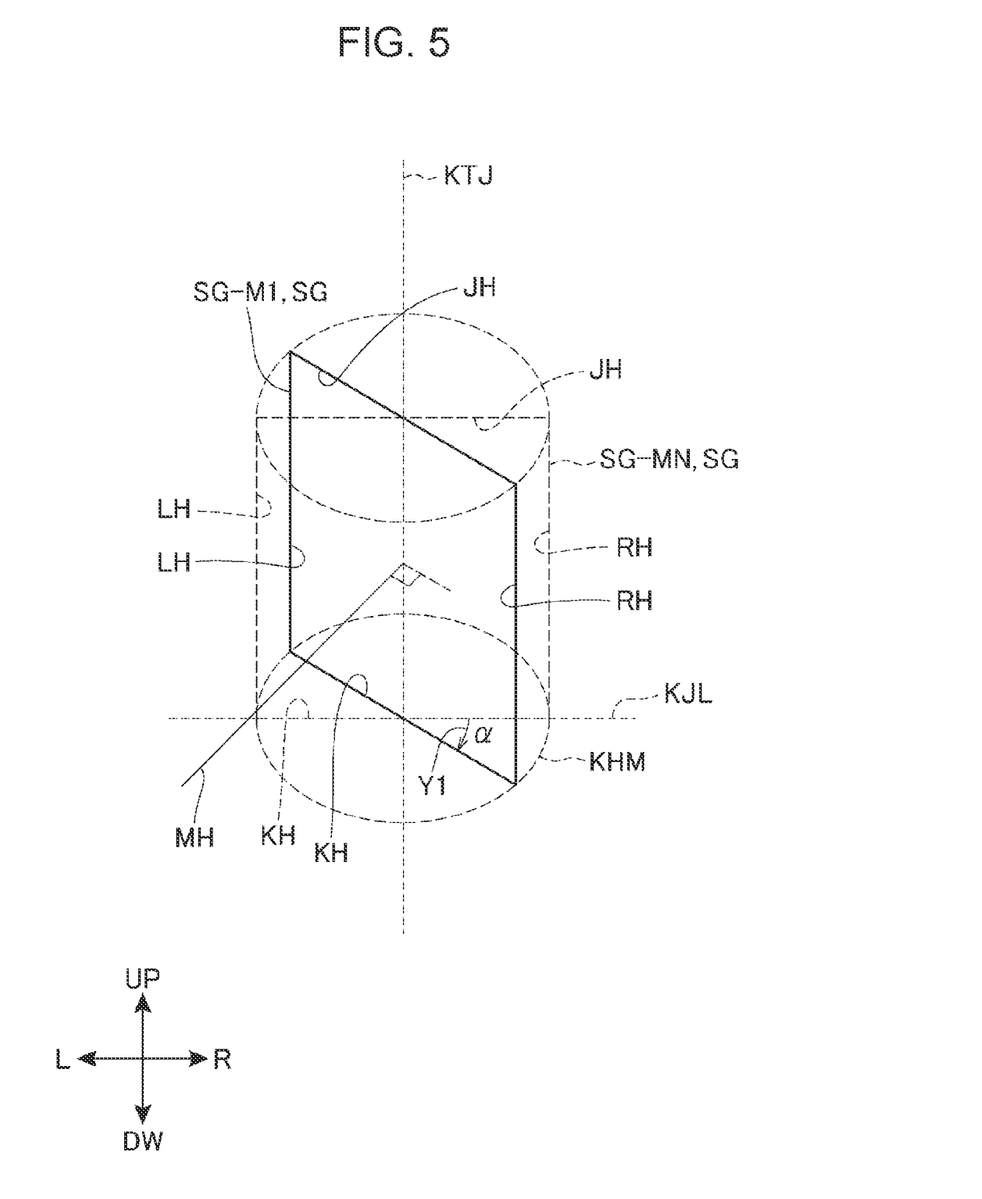
FIG. 5 is a diagram for explaining an orientation of an image face of a thumbnail image.
Figure 6:
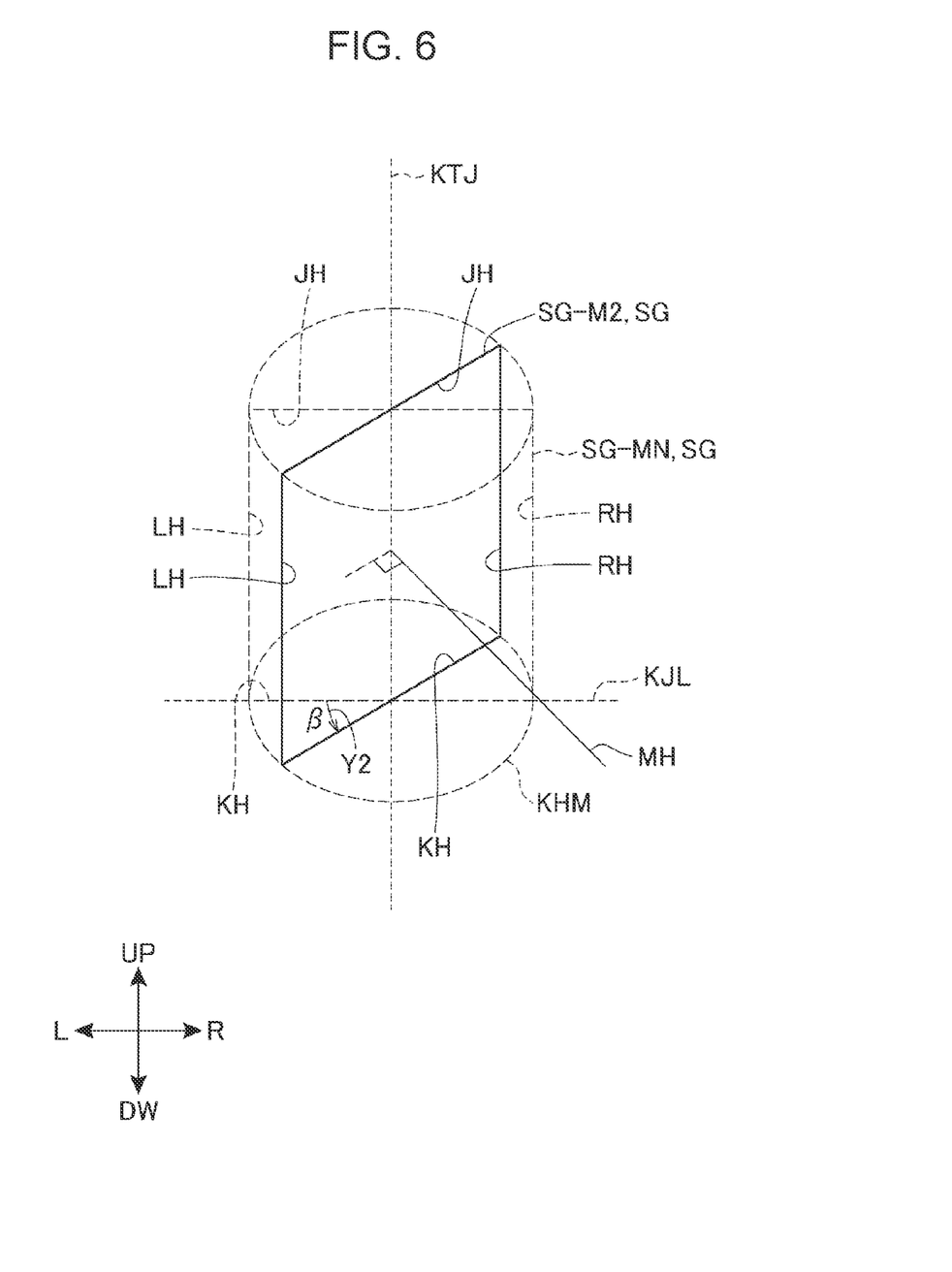
FIG. 6 is a diagram for explaining an orientation of an image face of a thumbnail image.

The orientation of the image face of the thumbnail image SG will be described in detail with reference to FIGS. 5 and 6. FIGS. 5 and 6 are diagrams for explaining the orientation of the image face of the thumbnail image SG.

As shown in FIGS. 5 and 6, each of the thumbnail images SG is an image when viewing the thumbnail image SG disposed in the virtual space in a bird's-eye view from a predetermined viewpoint in the virtual space in the thumbnail image group display area HA1. The virtual space includes a virtual horizontal plane KHM and a rotation axis KTJ perpendicular to the virtual horizontal plane KHM. The direction in which the rotation axis KTJ extends corresponds to the vertical direction. The direction in which a reference line KJL set in the virtual horizontal plane KHM extends corresponds to the left-right direction and the direction in which the virtual axis KJ extends.

The display controller 101 rotates each of the thumbnail images SG at a predetermined rotation angle about the rotation axis KTJ with the reference line KJL as a reference. Each of the thumbnail images SG is displayed in a mode with each of them inclined obliquely with respect to the reference line KJL.

In the present embodiment, the orientation of the image face of the thumbnail image SG is the orientation of a surface normal MH. FIG. 5 indicates a thumbnail image SG whose image face faces in a first orientation, and a thumbnail image SG whose image face faces in neither the first orientation nor a second orientation. FIG. 6 indicates a thumbnail image SG whose image face faces in a second orientation, and a thumbnail image SG whose image face faces in neither the first orientation nor the second orientation.

In FIG. 5, the character string "-M1" is attached to the thumbnail image SG whose image face faces in the first orientation. In FIG. 6, the character string "-M2" is attached to the thumbnail image SG whose image face faces in the second orientation. In FIGS. 5 and 6, the character string "-MN" is attached to the thumbnail image SG whose image face faces in neither the first orientation nor the second orientation.

The thumbnail image SG-MN is an image whose upper side JH and lower side KH are parallel to the reference line KJL in the virtual space. In the present embodiment, the surface normal MH of the thumbnail image SG when the upper side JH and the lower side KH in the virtual space are parallel to the reference line KJL has the same orientation as the surface normal MH of the display face 12A. The thumbnail image SG-MN is an image in which the orientation of the image face is the same as the orientation of the display face 12A. The thumbnail image SG-M1 and the thumbnail image SG-M2 are images in which the orientation of the image face is different from the orientation of the display face 12A.

As shown in FIG. 5, the thumbnail image SG-M1 is a thumbnail image SG that is rotated in the range of $0°<\alpha<90°$ in the virtual space when the reference line KJL corresponds to 0° and a direction indicated by an arrow Y1 is the plus direction. The surface normal MH of the image face of the thumbnail image SG-M1 is leftward in the direction in which the reference line KJL extends in the virtual space. The first orientation is a left direction in the direction in which the reference line KJL extends in the virtual space. The first orientation is a left direction of the virtual axis KJ. The left direction corresponds to an example of one direction.

As shown in FIG. 6, the thumbnail image SG-M2 is a thumbnail image SG that is rotated in the range of $0°>\beta>-90°$ in the virtual space when the reference line KJL corresponds to 0° and a direction indicated by an arrow Y2 is the minus direction. The surface normal MH of the image face of the thumbnail image SG-M2 is rightward in the direction in which the reference line KJL extends in the virtual space. The second orientation is a right direction in the direction in which the reference line KJL extends. The second orientation is a right direction of the virtual axis KJ. The right direction corresponds to an example of the other direction.

The thumbnail image SG displayed in the right area HA1-R is an image whose image face faces in the first orientation. The display controller 101 superimposes part of the adjacent thumbnail images SG with respect to each of the thumbnail images SG displayed in the right area HA1-R, and rotates and displays each of them at a corresponding rotation angle $\alpha$ at a position in the left-right direction.

The thumbnail image SG displayed in the left area HA1-L is an image whose image face faces in the second orientation. The display controller 101 superimposes part of the adjacent thumbnail images SG with respect to each of the thumbnail images SG displayed in the left area HA1-L, and rotates and displays each of them at a corresponding rotation angle $\beta$ at a position in the left-right direction.

Returning to the description of FIG. 4, the thumbnail image SG2-92 is displayed in a state of being moved upward of the thumbnail image group display area HA1 shown in FIG. 4. The upward direction corresponds to an example of a predetermined direction. The touch panel 12 receives an upward movement operation by a predetermined touch operation on each of the thumbnail images SG displayed in the thumbnail image group display area HA1. The predetermined touch operation includes a slide operation in the upward direction. When the touch panel 12 receives the upward movement operation, the display controller 101 moves the thumbnail image SG to be operated by the upward movement operation upward of the thumbnail image group display area HA1. The touch panel 12 receives the downward movement operation by a predetermined touch operation on the thumbnail image SG that has been moved upward by the upward movement operation. When the touch panel 12 receives the downward movement operation on the thumbnail image SG, the display controller 101 moves the thumbnail image SG to be operated by the downward movement operation downward in the thumbnail image group display area HA1 and returns the thumbnail image SG to the position before the movement by the upward movement operation. The upward movement operation corresponds to an example of the second operation.

In the thumbnail image group display area HA1 shown in FIG. 4, a sticky note image FG is added to each of the thumbnail images SG2-91, SG2-93, SG2-96, and SG2-102. The sticky note image FG is an image extending in the vertical direction. Each of the sticky note images FG extends upward from the upper end portion of the thumbnail image SG toward the outside of the image face of the thumbnail image SG. The sticky note image FG corresponds to an example of an object.

The sticky note image FG is added at a first position I1 of the thumbnail image SG whose image face faces in the first orientation. The sticky note image FG is added at a second position I2 of the thumbnail image SG whose image face faces in the second orientation.

Figure 7:
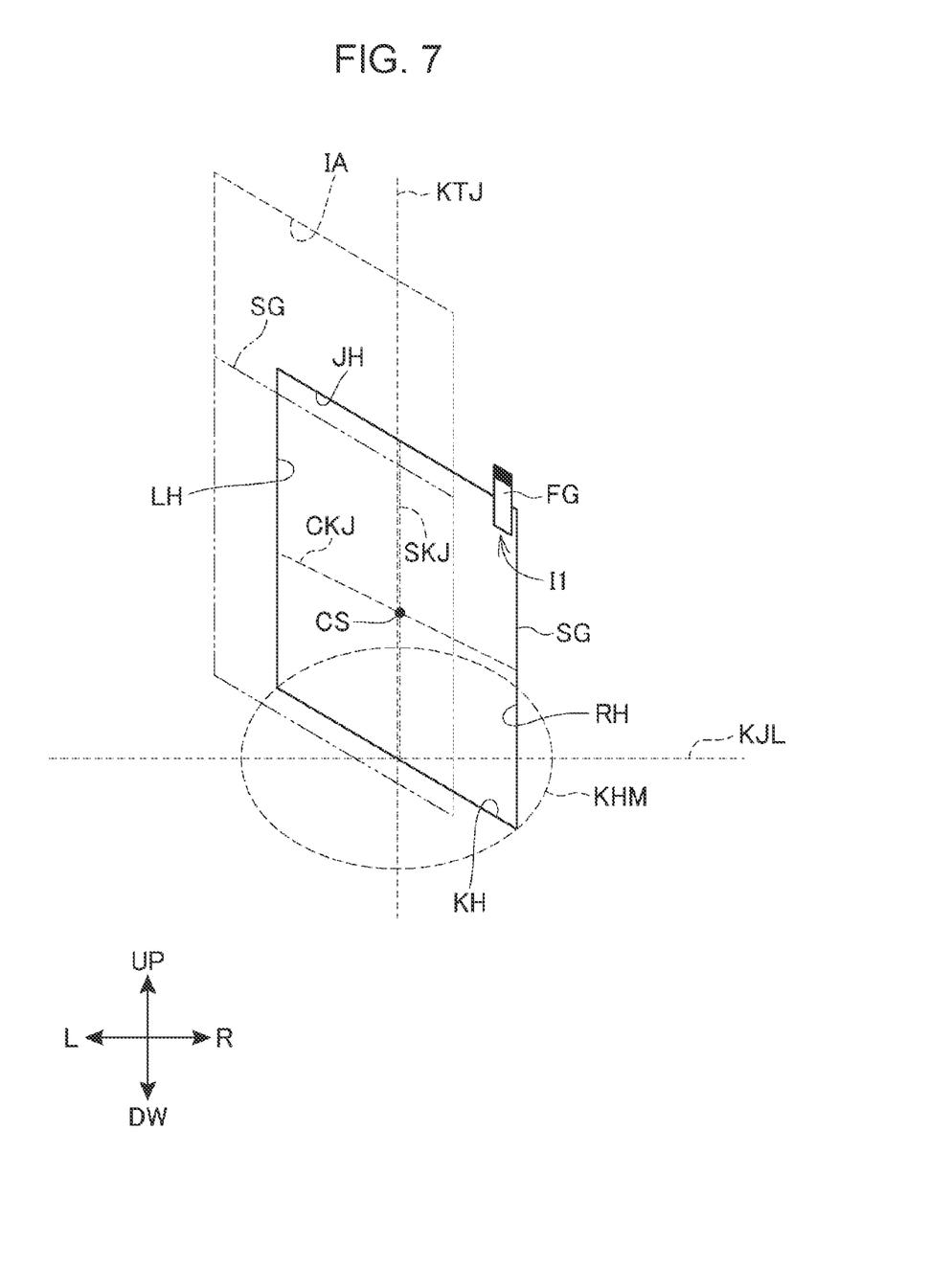
FIG. 7 is a diagram for explaining a position at which a sticky note image is added.
Figure 8:
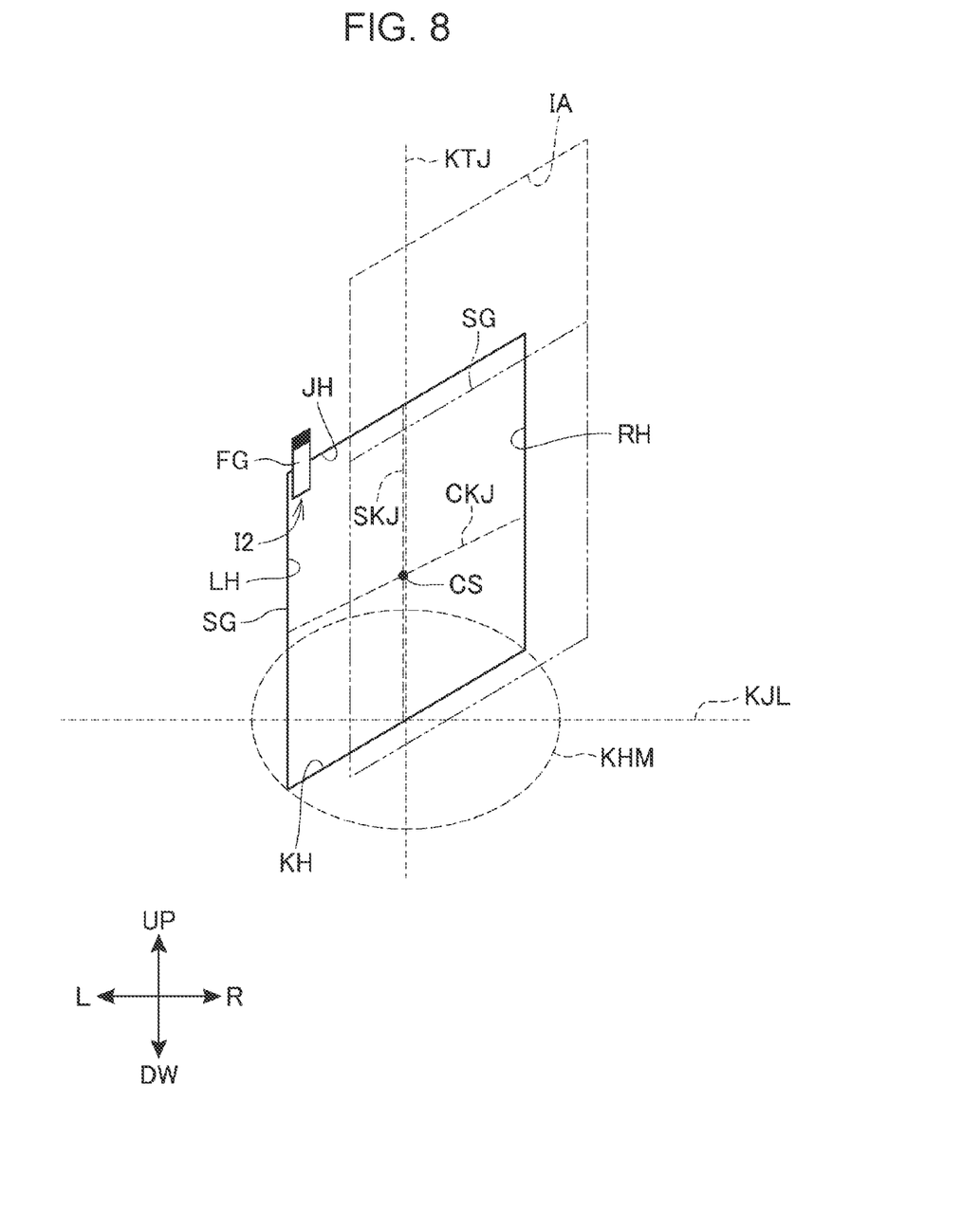
FIG. 8 is a diagram for explaining a position at which a sticky note image is added.

The position at which the sticky note image FG is added will be described in detail with reference to FIGS. 7 and 8. FIGS. 7 and 8 are diagrams for explaining the position at which the sticky note image FG is added.

The first position I1 will be described with reference to FIG. 7. The sticky note image FG is added at the first position I1 of the thumbnail image SG whose image face faces in the first orientation. The first position I1 is a position in the right direction of a central virtual axis CKJ relative to a vertical virtual axis SKJ. The central virtual axis CKJ is a virtual axis in the image face parallel to the upper side JH and the lower side KH of the thumbnail image SG, and passes through a center CS in the image face. The vertical virtual axis SKJ is a virtual axis perpendicular to the central virtual axis CKJ in the image face and parallel to a right side RH and a left side LH of the thumbnail image SG.

FIG. 7 indicates the thumbnail image SG corresponding to a page before a page corresponding to the thumbnail image SG to which the sticky note image FG is added by the two-dot chain line. The first position I1 is a position in an area with which the thumbnail image SG corresponding to the previous page does not overlap in the direction in which the reference line KJL extends. The first position I1 is a position not included in a moving area IA of the thumbnail image SG corresponding to the previous page. The moving area IA is an area in which the thumbnail image SG is moved by the upward movement operation and the downward movement operation.

The display controller 101 adds the sticky note image FG at the first position I1 as a reference. The display controller 101 adds the sticky note image FG at a position where the center of the sticky note image FG in the lateral direction matches the first position I1 in the direction in which the reference line KJL extends. The first position I1 is a position where the thumbnail image SG of the previous page does not overlap, but part of the sticky note image FG added at the first position I1 may be hidden by the thumbnail image SG of the previous page.

The second position I2 will be described with reference to FIG. 8. The sticky note image FG is added at the second position I2 of the thumbnail image SG whose image face faces in the second orientation. The second position 12 is a position in the left direction of the central virtual axis CKJ in the direction in which the reference line KJL extends relative to the vertical virtual axis SKJ.

FIG. 8 indicates the thumbnail image SG corresponding to a page after a page corresponding to the thumbnail image SG to which the sticky note image FG is added by the two-dot chain line. The second position I2 is a position in an area with which the thumbnail image SG corresponding to the subsequent page does not overlap in the direction in which which the reference line KJL extends and. The second position I2 is a position not included in the moving area IA of the thumbnail image SG corresponding to the subsequent page.

The display controller 101 adds the sticky note image FG at the second position I2 as a reference. The display controller 101 adds the sticky note image FG at a position where the center of the sticky note image FG in the lateral direction matches the second position I2 in the direction in which the reference line KJL extends. The second position I2 is a position where the thumbnail image SG of the subsequent page does not overlap, but part of the sticky note image FG added at the second position I2 may be hidden by the thumbnail image SG of the previous page.

As described with reference to FIGS. 7 and 8, the sticky note image FG is added at the first position I1 and the second position I2. As shown in FIG. 4, the sticky note image FG is added at the front of the thumbnail image SG when viewed from a predetermined viewpoint in a bird's-eye view in the thumbnail image group display area HA1. It is assumed that the sticky note image FG is added at the back of the thumbnail image SG when viewed from a predetermined viewpoint. In this case, when there is a thumbnail image SG moved upward as in the thumbnail image SG2-92, the sticky note image FG may be hidden by the thumbnail image SG moved upward. When the sticky note image FG is added at the back, in FIG. 4, the sticky note image FG added to the thumbnail image SG2-91 is hidden by the thumbnail image SG2-92 moved upward. However, the sticky note image FG of the present embodiment is added at the front of the thumbnail image SG. As shown in FIG. 4, all of the sticky note image FG added to the thumbnail image SG2-91 is not hidden by the thumbnail image SG2-92 moved upward, and the user can recognize the sticky note image FG added to the thumbnail image SG2-91.

Figure 9:
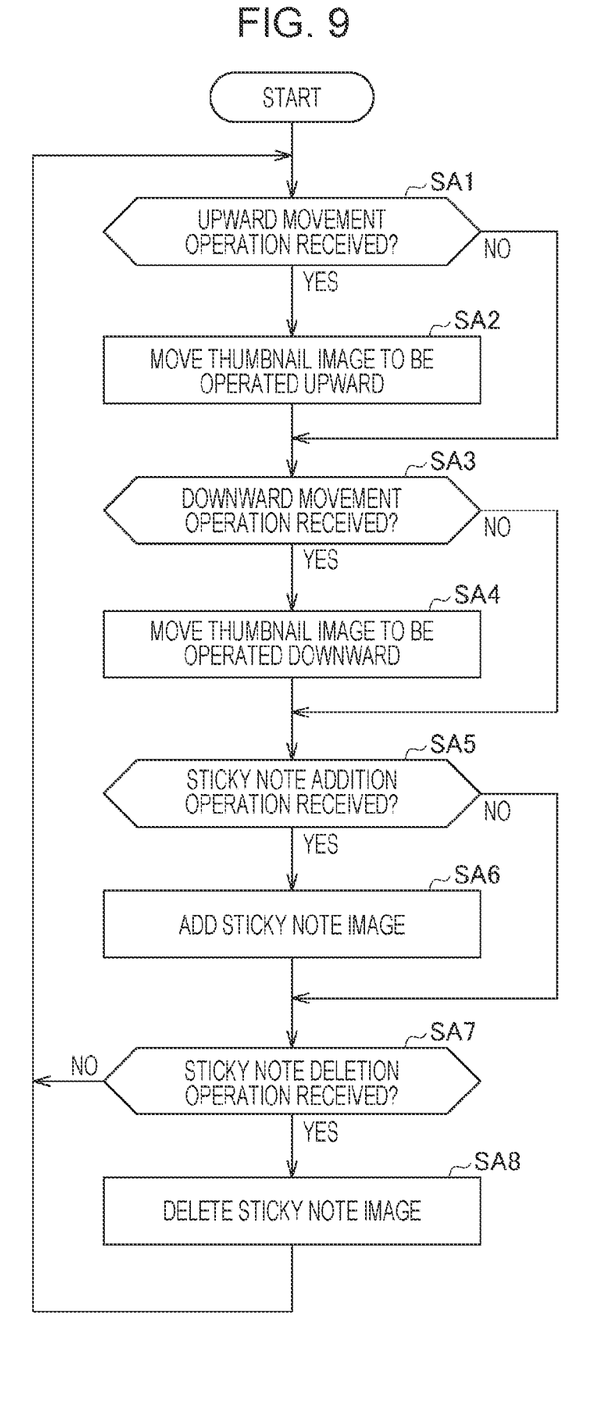
FIG. 9 is a flowchart showing an operation of a display controller.

Next, the operation of the display controller 101 will be described. FIG. 9 is a flowchart showing the operation of the display controller 101.

The display controller 101 determines whether the upward movement operation has been received in the thumbnail image group display area HA1 (step SA1).

When the display controller 101 determines that the upward movement operation is not received (step SA1: NO), the process proceeds to step SA3.

When the display controller 101 determines that the upward movement operation has been received (step SA1: YES), the display controller 101 moves the thumbnail image SG to be operated by the upward movement operation upward (step SA2).

The display controller 101 determines whether the downward movement operation has been received in the thumbnail image group display area HA1 (step SA3).

When the display controller 101 determines that the downward movement operation is not received (step SA3: NO), the process proceeds to step SA5.

When the display controller 101 determines that the downward movement operation has been received (step SA3: YES), the display controller 101 moves the thumbnail image SG to be operated by the downward movement operation downward (step SA4).

The display controller 101 determines whether the sticky note addition operation has been received by the selection application UI202B (step SA5). The sticky note addition operation is an operation for adding the sticky note image FG, and is performed by a predetermined touch operation. The sticky note addition operation corresponds to an example of the first operation.

When the display controller 101 determines that the sticky note addition operation is not received by the selection application UI202B (step SA5: NO), the process proceeds to step SA7.

When the display controller 101 determines that the sticky note addition operation has been received by the selection application UI202B (step SA5: YES), the display controller 101 adds the sticky note image FG to the thumbnail image SG to be operated by the sticky note addition operation (step SA6).

In step SA6, when the thumbnail image SG to be operated is located in the right area HA1-R, the display controller 101 adds the sticky note image FG at the first position I1. In step SA6, when the thumbnail image SG to be operated is located in the left area HA1-L, the display controller 101 adds the sticky note image FG at the second position I2.

When the display controller 101 determines that the sticky note deletion operation is not received by the selection application UI202B (step SA7: NO), the process returns to step SA1.

When the display controller 101 determines that the sticky note deletion operation has been received by the selection application UI202B (step SA7: YES), the display controller 101 deletes the sticky note image FG from the thumbnail image SG to be operated by the sticky note deletion operation (step SA8).

Figure 10:
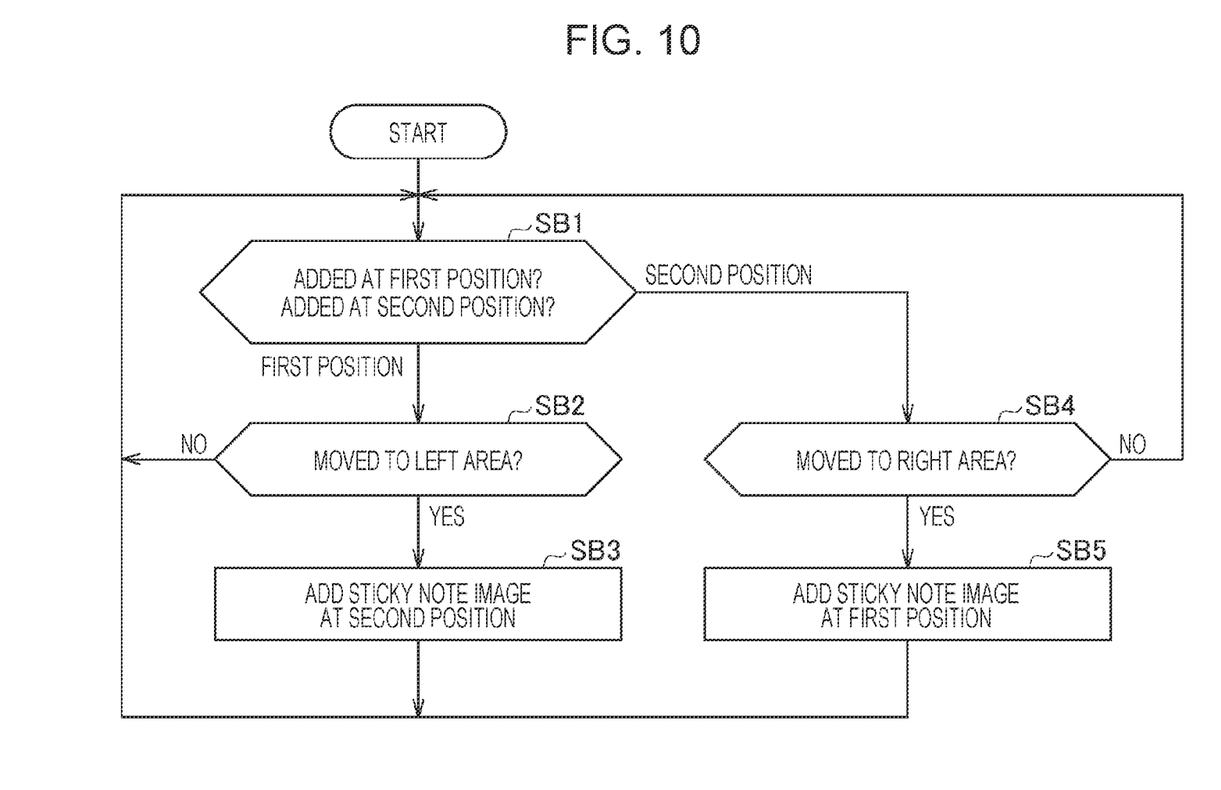
FIG. 10 is a flowchart showing an operation of a display controller.

FIG. 10 is a flowchart showing the operation of the display controller 101. The operation of FIG. 10 is performed on each of the thumbnail images SG to which the sticky note images FG are added among the thumbnail images SG displayed in the thumbnail image group display area HA1.

The display controller 101 determines whether the sticky note image FG is added at the first position I1 or the sticky note image FG is added at the second position I2 (step SB1).

When the display controller 101 determines that the sticky note image FG is added at the first position I1 (step SB1: first position), the display controller 101 determines whether the thumbnail image SG has moved to the left area HA1-L (step SB2).

When the display controller 101 determines that the thumbnail image SG has not moved to the left area HA1-L (step SB2: NO), the display controller 101 returns the process to step SB1.

When the display controller 101 determines that the thumbnail image SG has moved to the left area HA1-L (step SB2: YES), the display controller 101 adds the sticky note image FG at the second position I2 (step SB3).

Returning to the description of step SB1, when it is determined that the sticky note image FG is added at the second position I2 (step SB1: second position), the display controller 101 determines whether the thumbnail image SG has moved to the right area HA1-R (step SB4).

When the display controller 101 determines that the thumbnail image SG has not moved to the right area HA1-R (step SB4: NO), the display controller 101 returns the process to step SB1.

When the display controller 101 determines that the thumbnail image SG has moved to the right area HA1-R (step SB4: YES), the display controller 101 adds the sticky note image FG at the first position I1 (step SB5).

Other embodiments will be described.

Second Embodiment

In the first embodiment, the page image PG and the thumbnail image group SSG are displayed on the selection application UI202B. In the second embodiment, the thumbnail image group SSG is displayed, but the page image PG is not displayed on the selection application UI202B.

Third Embodiment

In the third embodiment, the thumbnail image group SSG displayed on the selection application UI202B and the thumbnail image group SSG displayed on the list application UI202A are displayed in the same display mode. When the sticky note image FG is added to the thumbnail image SG1-12 displayed by the selection application UI202B, the sticky note image FG is added to the thumbnail image SG1-12 of the first thumbnail image group SSG1 displayed by the list application UI202A. When the thumbnail image SG2-111 displayed by the selection application UI202B moves upward, the thumbnail image SG2-111 of the second thumbnail image group SSG2 displayed by the list application UI202A is displayed in a state of moving upward.

According to the above-described embodiment, the following effects are obtained. In the following description, each of the first thumbnail image SG and the second thumbnail image SG do not refer to a specific thumbnail image SG. The first thumbnail image SG refers to any thumbnail image SG, and the second thumbnail image SG refers to a thumbnail image SG different from the first thumbnail image SG. The first thumbnail image SG corresponds to an example of the first image. The second thumbnail image SG corresponds to an example of the second image.

As described above, in the display control method using the smartphone 1, the first thumbnail image SG and the second thumbnail image SG corresponding to the pages constituting the document are displayed side by side on the virtual axis KJ of the display face 12A. In this display control method, when receiving from a user a sticky note addition operation on the first thumbnail image SG, the sticky note image FG extending outside the image face of the first thumbnail image SG is added to the first thumbnail image SG, and when receiving from the user an upward movement operation on the second thumbnail image SG, the second thumbnail image SG is moved upward.

By moving a desired thumbnail image SG upward, the user can grasp part of the image face of the desired thumbnail image SG, and can easily grasp the outline of the desired thumbnail image SG. By adding the sticky note image FG to the desired thumbnail image SG, it is possible to process the desired thumbnail image SG for the purpose other than grasping the outline. The user can easily grasp the outline of the desired page, and the thumbnail image SG corresponding to the desired page can be processed according to the user's purpose.

When the smartphone 1 receives a sticky note addition operation from the user on the second thumbnail image SG, the smartphone 1 adds the sticky note image FG extending outside the second image face of the second thumbnail image SG to the second thumbnail image SG.

According to this, the user can add the sticky note images FG to the plurality of thumbnail images SG.

When the orientation of the image face of the first thumbnail image SG is the first orientation different from the orientation of the display face 12A, the smartphone 1 adds the sticky note image FG to the first position I1 and when the orientation of the image face of the first thumbnail image SG is the second orientation different from the orientation of the display face 12A, the smartphone 1 adds the sticky note image FG to the second position I2.

According to this, the smartphone 1 can change the position at which the sticky note image FG is added according to the two display states of the thumbnail image SG. The smartphone 1 can add a sticky note image FG while suppressing a change in appearance depending on the two display states of the thumbnail image SG, and the user can easily determine which thumbnail image SG the thumbnail image SG to which the sticky note image FG is added is.

The first orientation is a left direction of the virtual axis KJ. The second orientation is a right direction of the virtual axis KJ.

According to this, the user can easily determine which thumbnail image SG the thumbnail image SG to which the sticky note image FG is added is, regardless of whether the image face of the thumbnail image SG faces in the left direction or the right direction of the virtual axis KJ.

The first position I1 is a position in right direction of the central virtual axis CKJ relative to the vertical virtual axis SKJ extending in the image face of the first thumbnail image SG and perpendicular to the central virtual axis CKJ passing through the center of the image face in the image face. The second position I2 is a position in the left direction of the central virtual axis CKJ relative to the vertical virtual axis SKJ.

According to this, the smartphone 1 can add the sticky note image FG to the thumbnail image SG facing in the first orientation and the thumbnail image SG facing in the second orientation. The user can more easily grasp which thumbnail image SG the thumbnail image SG to which the sticky note image FG is added is.

The second thumbnail image SG is displayed with the second thumbnail image SG partially overlapping with the first thumbnail image SG. Each of the first position I1 and the second position I2 is a position in the area with which the second thumbnail image SG does not overlap on the image face of the first thumbnail image SG.

According to this, by the display in which the thumbnail images SG partially overlaps with each other, the smartphone 1 can suppresses a state in which the sticky note image FG is hidden by another thumbnail image SG, and add the sticky note image FG to the thumbnail image SG. By the display in which the thumbnail images SG partially overlaps with each other, the user can easily grasp which thumbnail image SG the thumbnail image SG to which the sticky note image FG is added is.

Each of the first position I1 and the second position I2 is a position not included in the moving area IA of the second thumbnail image SG where the position is located on the image face of the first thumbnail image SG.

According to this, the smartphone 1 can suppress a state in which the sticky note image FG is hidden by another thumbnail image SG that has moved upward, and can add the sticky note image FG to the thumbnail image SG. When there is a thumbnail image SG moved upward, the user can easily grasp which thumbnail image SG the thumbnail image SG to which the sticky note image FG is added is.

The display application 111 causes the processor 100 to display the first thumbnail image SG and the second thumbnail image SG corresponding to the pages constituting the document side by side on the virtual axis KJ of the display face 12A, and add the sticky note image FG extending outside the image face of the first thumbnail image SG to the first thumbnail image SG when a sticky note addition operation is received from the user on the first thumbnail image SG, and move the second thumbnail image SG upward when an upward movement operation is received from the user on the second thumbnail image SG.

According to the display application 111, the same effect as the effect of the display control method described above is obtained.

The smartphone 1 includes the operation unit of the touch panel 12 that receives a user's operation and has the display face 12A, and the display controller 101 that causes the touch panel 12 to display the first thumbnail image SG and the second thumbnail image SG corresponding to pages constituting the document side by side on the virtual axis KJ of the display face 12A. The display controller 101 adds the sticky note image FG extending outside the image face of the first thumbnail image SG to the first thumbnail image SG when the touch panel 12 receives from a user a sticky note addition operation on the first thumbnail image SG, and moves the second thumbnail image SG upward when the touch panel 12 receives from the user an upward movement operation on the second thumbnail image SG.

According to the smartphone 1, the same effect as the effect of the display control method described above is obtained.

Each of the above-described embodiments shows an aspect, and can be modified and applied in any manner.

The display controller 101 may add a sticky note image FG having a different color to the thumbnail image SG according to the operation by the user.

The object is not limited to the sticky note image FG. The object may be an object to be added to the thumbnail image SG according to the user's purpose.

The printer 2 may have a function other than the print function such as a scan function and a facsimile function.

The display device is not limited to the smartphone 1. The display device may be a tablet-type PC, a desktop-type PC, a laptop-type PC, or the like.

The operation unit and the display unit are not limited to the touch panel 12. The display unit may be a display composed of a light emitting diode (LED), an organic light emitting diode (OLED), or the like. The operation unit may be any device that is connected to an operation switch, an input unit such as a mouse or a keyboard, detects a user's operation, and outputs the detection result to the controller 10.

The function of the controller 10 may be implemented by a plurality of processors or a semiconductor chip.

Each unit shown in FIG. 1 is an example and is not particularly limited. It is not necessarily required to implement hardware corresponding to respective units, but it is of course possible to construct a configuration in which the functions of the respective units are implemented by executing a program by one processor. Part of the functions implemented by software may be implemented by hardware, or part of the functions implemented by hardware may be implemented by software. In addition, the specific detailed configuration of other units of the smartphone 1 can be changed in any manner.

The operation step units shown in the step units of the operations shown in FIGS. 9 and 10 are divided in accordance with the main processing contents in order to facilitate understanding of the operations of the display controller 101. Thus, the present disclosure is not limited by the division method and the name of the processing units. Depending on the processing contents, the process may be divided into more step units. One step unit may be divided so as to include more processes. Moreover, the order of the steps may be changed as appropriate.

What is claimed is:

1. A display control method for displaying a first image and a second image each corresponding to a page constituting a document side by side on a virtual axis of a display face, the method comprising:
   adding, to the first image, an object extending outside an image face of the first image when a first operation is received from a user on the first image, the addition comprising adding the object to a first position when an orientation of the image face of the first image is a first orientation different from an orientation of the display face; and adding the object to the second position when an orientation of the image face of the first image is a second orientation different from the orientation of the display face; and
   moving the second image in a predetermined direction when a second operation is received from the user on the second image.

2. The display control method according to claim 1, wherein
   the first orientation is one direction of the virtual axis, and wherein the second orientation is the other direction of the virtual axis.

3. The display control method according to claim 2, wherein
   the first position is a position in one direction of a central virtual axis relative to a vertical virtual axis extending in the image face of the first image and perpendicular to the central virtual axis passing through a center of the image face in the image face, and wherein
   the second position is a position in the other direction of the central virtual axis relative to the vertical virtual axis.

4. The display control method according to claim 1, wherein
   the second image is displayed with the second image partially overlapping with the first image and wherein
   each of the first position and the second position is a position in an area with which the second image is not overlapping on the image face of the first image.

5. The display control method according to claim 4, wherein
   the second image is displayed with the second image partially overlapping with the first image and wherein
   each of the first position and the second position is a position not being included in a moving area of the second image, the position being located on the image face of the first image.

6. A non-transitory computer-readable storage medium storing a program, the program causing a processor of a display device having a display face to:
   display a first image and a second image each corresponding to a page constituting a document side by side on a virtual axis of a display face;
   add, to the first image, an object extending outside an image face of the first image when a first operation is received from a user on the first image by adding the object to a first position when an orientation of the image face of the first image is a first orientation different from an orientation of the display face and adding the object to the second position when an orientation of the image face of the first image is a second orientation different from the orientation of the display face; and
   move the second image in a predetermined direction when a second operation is received from the user on the second image.

7. A display device comprising:
an operation unit that receives an operation by a user;
a display unit having a display face; and
a display controller that causes the display unit to display a first image and a second image each corresponding to a page constituting a document side by side on a virtual axis of the display face, wherein
the display controller
adds, to the first image, an object extending outside an image face of the first image when the operation unit receives a first operation on the first image from a user by adding the object to a first position when an orientation of the image face of the first image is a first orientation different from an orientation of the display face and adding the object to the second position when an orientation of the image face of the first image is a second orientation different from the orientation of the display face, and
moves the second image in a predetermined direction when the operation unit receives a second operation on the second image from the user.

* * * * *